(12) United States Patent
Fiedler et al.

(10) Patent No.: US 12,227,255 B2
(45) Date of Patent: Feb. 18, 2025

(54) CLOSURE DEVICE FOR CONNECTING TWO ASSEMBLIES TO ONE ANOTHER

(71) Applicant: Fidlock GmbH, Hannover (DE)

(72) Inventors: Joachim Fiedler, Hannover (DE); Breido Botkus, Hannover (DE); Friedemann Richter, Hannover (DE); Dennis Dierschke, Hannover (DE)

(73) Assignee: Fidlock GmbH, Hannover (DE)

( * ) Notice: Subject to any disclaimer, the term of this patent is extended or adjusted under 35 U.S.C. 154(b) by 618 days.

(21) Appl. No.: 17/606,077

(22) PCT Filed: Apr. 27, 2020

(86) PCT No.: PCT/EP2020/061590
§ 371 (c)(1),
(2) Date: Oct. 25, 2021

(87) PCT Pub. No.: WO2020/216955
PCT Pub. Date: Oct. 29, 2020

(65) Prior Publication Data
US 2022/0194507 A1 Jun. 23, 2022

(30) Foreign Application Priority Data
Apr. 26, 2019 (DE) .................... 10 2019 206 054.4

(51) Int. Cl.
*B62J 9/27* (2020.01)
*B62J 9/22* (2020.01)
(Continued)

(52) U.S. Cl.
CPC . *B62J 9/27* (2020.02); *B62J 9/22* (2020.02); *F16B 2/185* (2013.01); *F16B 21/073* (2013.01); *F16B 2200/83* (2023.08)

(58) Field of Classification Search
CPC ....... B62J 9/27; B62J 9/22; B62J 11/00; B62J 7/08; F16B 2/185; F16B 21/073
(Continued)

(56) References Cited

U.S. PATENT DOCUMENTS 9,706,814 B2 * 7/2017 Converse .............. A61F 5/0123
10,328,983 B2 * 6/2019 Fiedler ..................... B62J 11/04
(Continued)

FOREIGN PATENT DOCUMENTS

CN        202641956 U    1/2013
DE     102010044144 B3   5/2012
(Continued)

*Primary Examiner* — Nathan J Newhouse
*Assistant Examiner* — Lester L Vanterpool
(74) *Attorney, Agent, or Firm* — The Webb Law Firm

(57) ABSTRACT

Provided is a closure device for connecting two assemblies to one another. The closure device includes a first closure part which has a locking piece with a first locking section and a first magnetic element, a second closure part which has a second locking section and a second magnetic element, and an arresting mechanism which is arranged on the second closure part and which has an arresting element and an actuating mechanism operatively connected to the arresting element. The arresting element can be brought into operative connection with the locking piece in the closed position, in order to lock the positively locked engagement between the first locking section and the second locking section. The actuating mechanism may be actuated in order to adjust the arresting element relative to the locking receptacle so that the first locking section and the second locking section are releasable from one another.

16 Claims, 12 Drawing Sheets

(51) Int. Cl.
*F16B 2/18* (2006.01)
*F16B 21/07* (2006.01)

(58) Field of Classification Search
USPC .................................... 224/425, 414, 441
See application file for complete search history.

(56) References Cited

U.S. PATENT DOCUMENTS

| | | | |
|---|---|---|---|
| 10,385,895 | B2 | 8/2019 | Fiedler et al. |
| 10,703,429 | B2 | 7/2020 | Fiedler et al. |
| 10,874,178 | B2 * | 12/2020 | Cheng ................ A44B 11/2584 |
| 2011/0042435 | A1 * | 2/2011 | Weng ...................... B62J 11/04 224/412 |
| 2011/0147424 | A1 * | 6/2011 | Brown ..................... B62J 11/04 224/567 |
| 2012/0124786 | A1 | 5/2012 | Fiedler |
| 2012/0280096 | A1 | 11/2012 | Goldman |
| 2014/0308062 | A1 * | 10/2014 | Belozerova ................ B62J 9/27 403/14 |
| 2014/0339232 | A1 * | 11/2014 | Fiedler ................ E05B 47/0038 220/348 |
| 2015/0089779 | A1 * | 4/2015 | Lawrence ................ F16B 2/10 24/68 BT |

FOREIGN PATENT DOCUMENTS

| | | |
|---|---|---|
| DE | 102014213383 A1 | 1/2016 |
| DE | 102016216422 A1 | 3/2018 |
| DE | 102018115527 A1 | 1/2019 |
| WO | 2012151320 A9 | 11/2012 |
| WO | 2013075851 A1 | 5/2013 |

\* cited by examiner

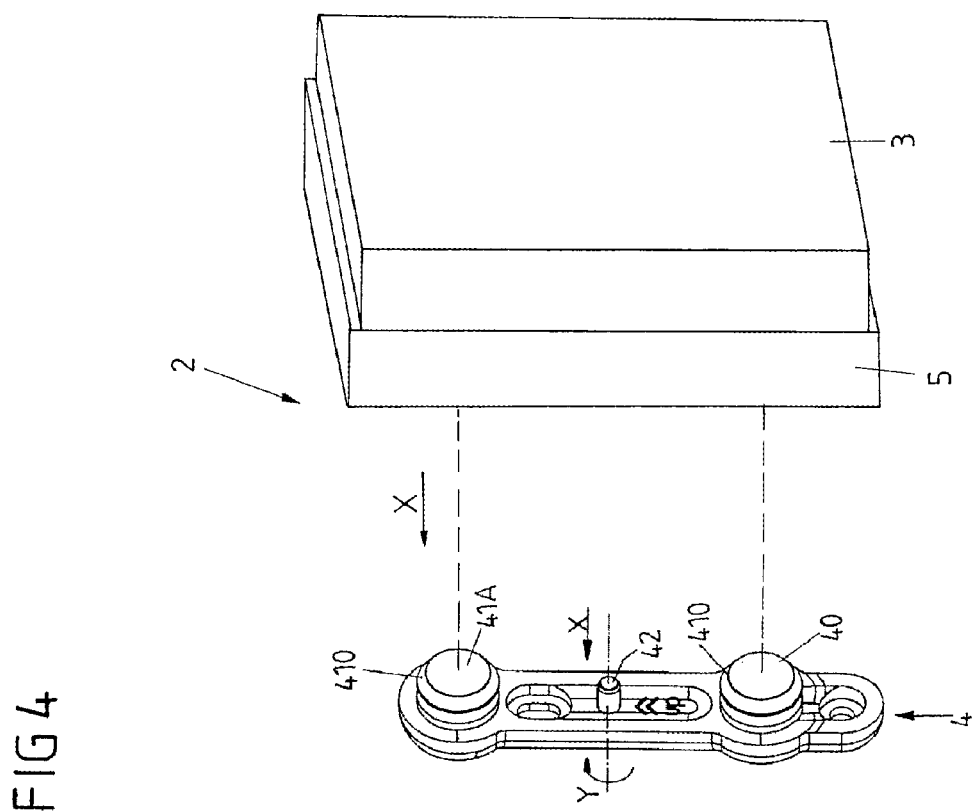

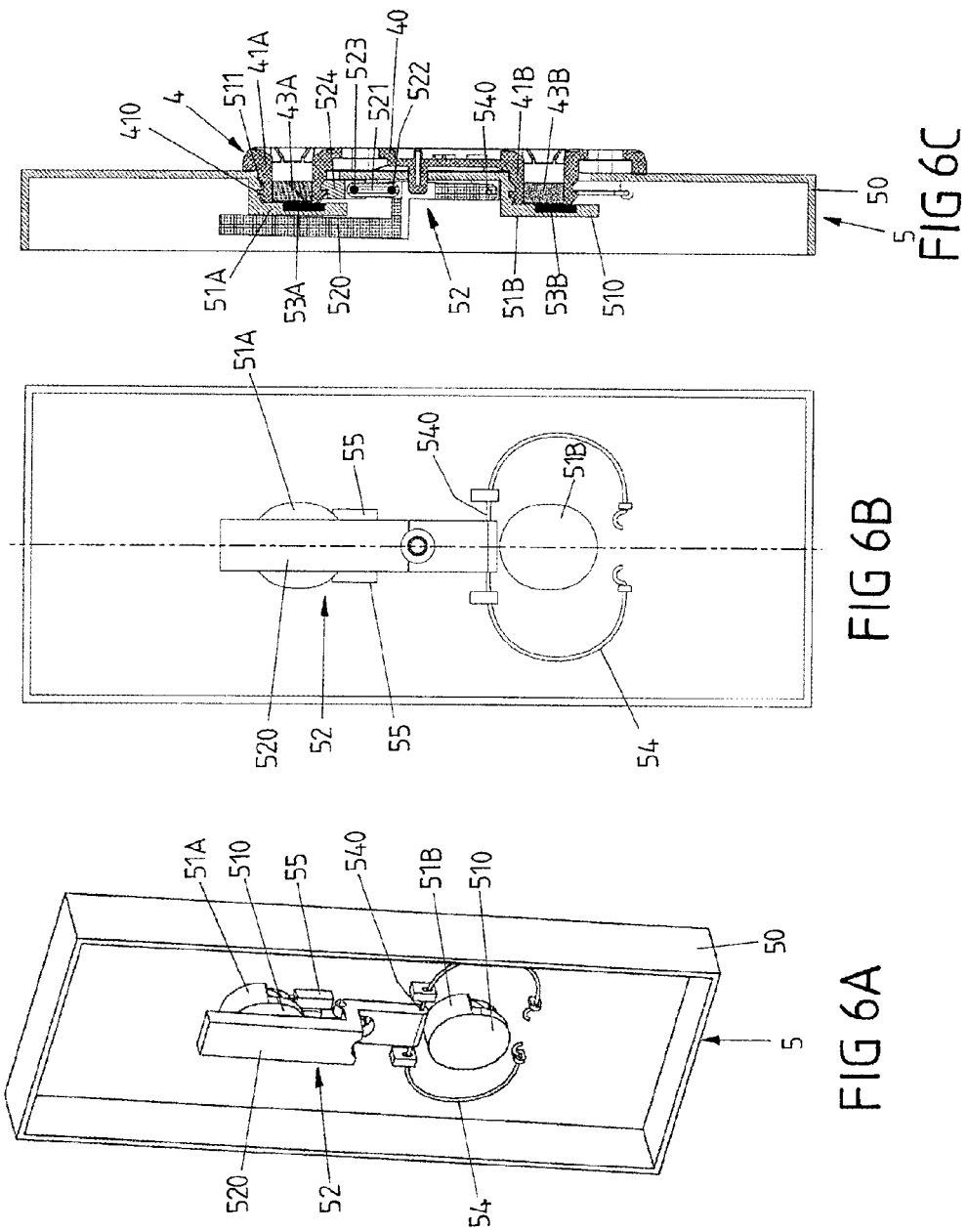

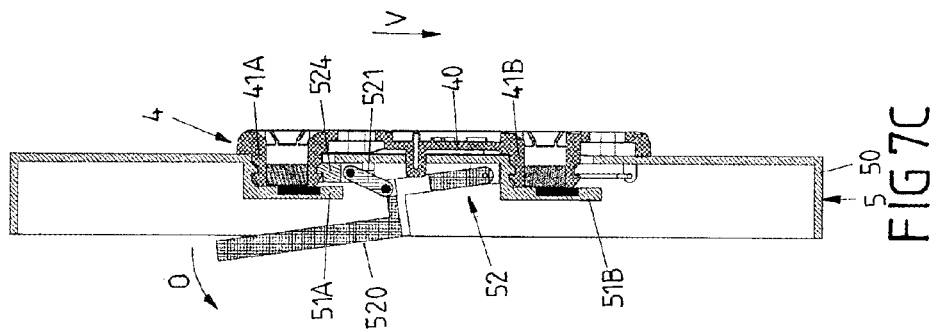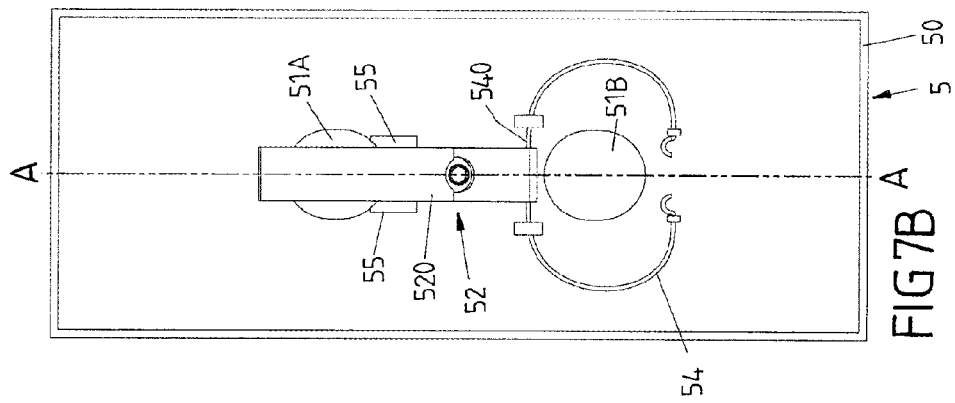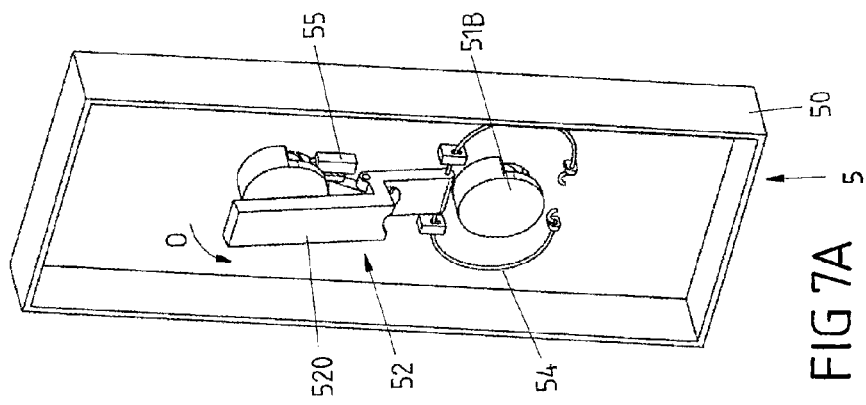

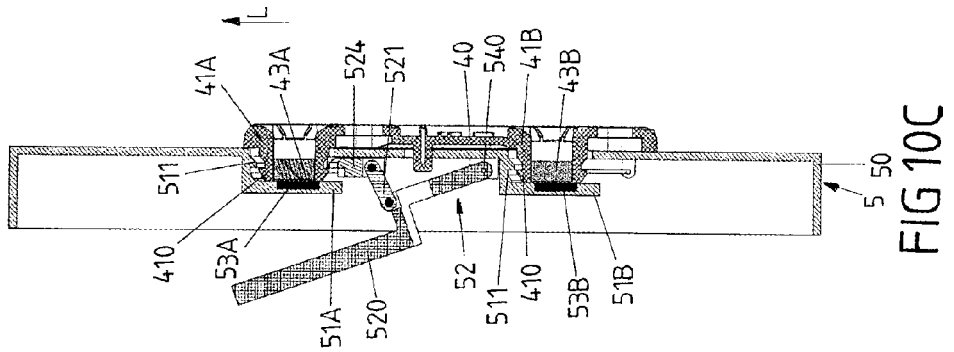
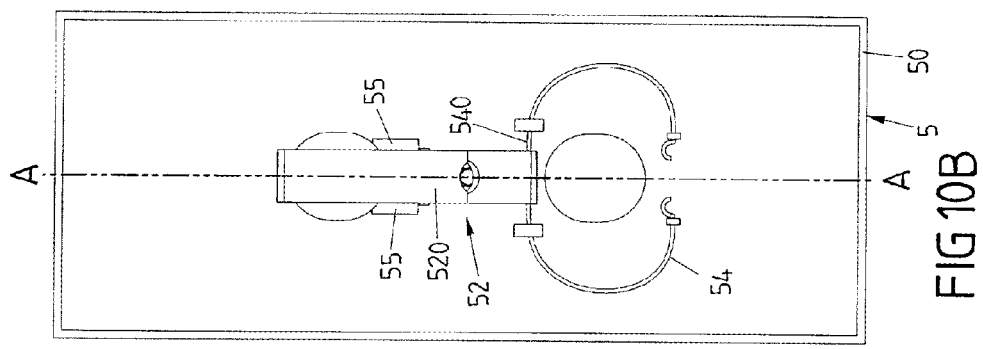
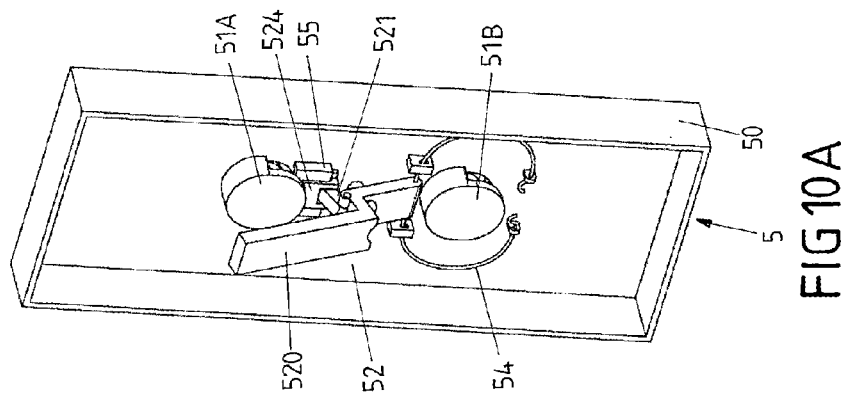

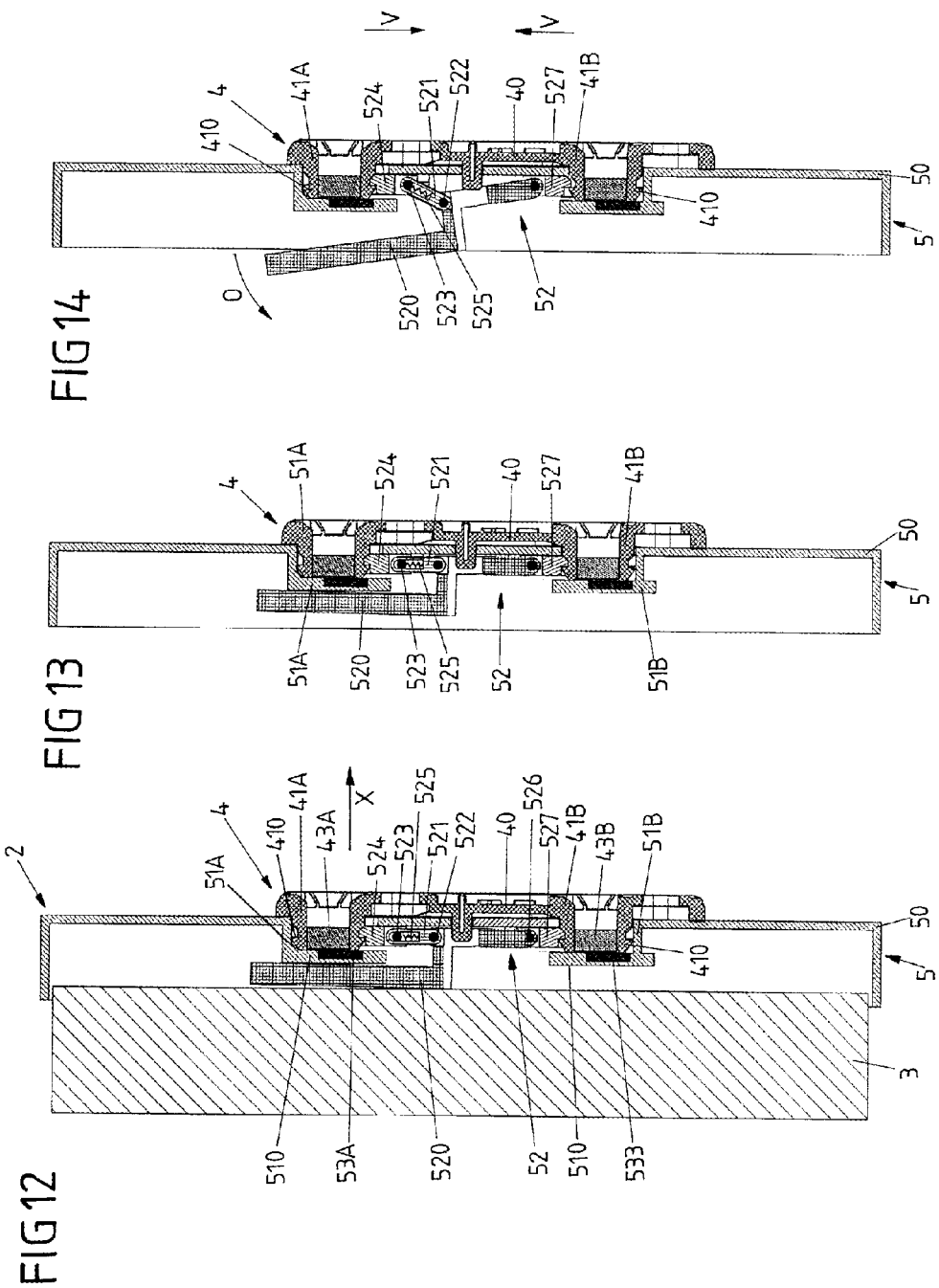

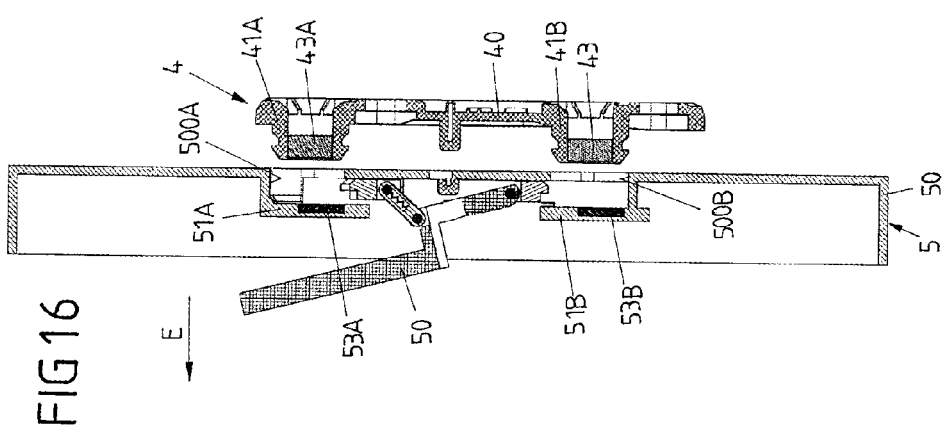
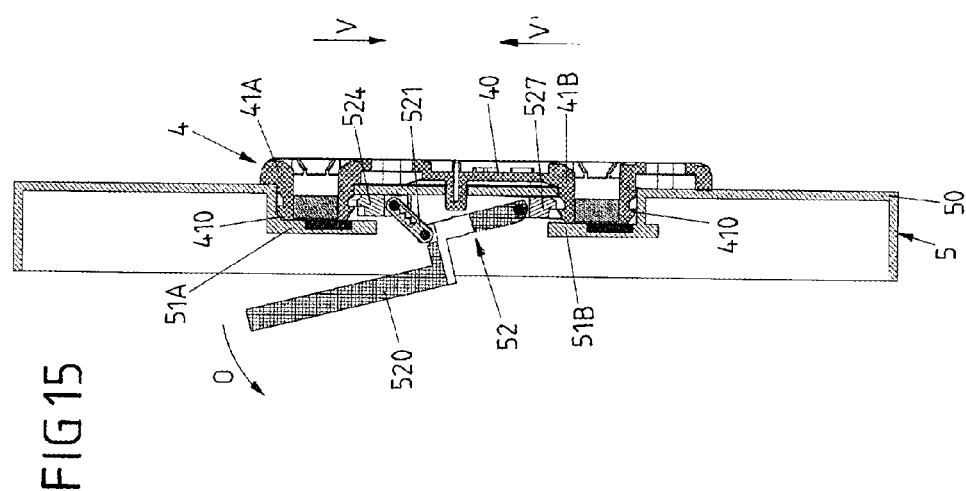

CLOSURE DEVICE FOR CONNECTING TWO ASSEMBLIES TO ONE ANOTHER

CROSS-REFERENCE TO RELATED APPLICATIONS

This application is the United States national phase of International Application No. PCT/EP2020/061590 filed Apr. 27, 2020, and claims priority to German Patent Application No. 10 2019 206 054.4 filed Apr. 26, 2019, the disclosures of which are hereby incorporated by reference in their entirety.

BACKGROUND OF THE INVENTION

Field of the Invention

The disclosure relates to a closure device for connecting two assemblies to one another, in particular for connecting an object to a frame of a vehicle, for example a bicycle.

Description of Related Art

Such a closure device comprises a first closure part which is to be arranged on one of the assemblies and which has a locking piece with a first locking section and has a first magnetic element. The closure device additionally comprises a second closure part which is to be fastened to the other of the assemblies and which has a locking receptacle with a second locking section and has a second magnetic element. The first closure part and the second closure part are able to be attached to one another in a closing direction and are connected to one another in a closed position by positive locking counter to the closing direction. This is carried out by the locking piece of the first closure part being received in the locking receptacle of the second closure part and the first locking section of the locking piece being in a positively locked engagement with the second locking section of the locking receptacle.

In this case the closure device is configured to be magnetic, in that magnetic elements of the closure parts cooperate by magnetic attraction and in this manner assist the attachment of the closure parts to one another for closing the closure device.

Such a closure device may serve, for example, for fastening an assembly, such as for example a drinking bottle or a bag, a bicycle lock or a further object, to the frame of a bicycle.

In a closure disclosed in WO 2012/151320 A9, a clamping bracket is fastened to a frame and has magnetic elements which cooperate with a magnetically active ring of the drinking bottle for fastening a drinking bottle to the frame.

It is also known to fasten containers in the form of drinking bottles in a latching manner to a frame of a vehicle, wherein in this context it has also been considered to use magnetic elements for securing the connection.

In general, a closure device by which an object (for example a drinking bottle or a bicycle lock) may be secured to the frame of a vehicle (in particular a two-wheeled vehicle or a three-wheeled vehicle) is intended to be simple to operate. The object is intended to be able to be accommodated in a space-saving manner on the vehicle, wherein only a limited amount of space is available, for example, in a frame opening of a bicycle frame. In the open position, the closure device is intended to have a small amount of installation space both on the vehicle and on the object so that the closure parts of the closure device do not interfere.

It is also desirable to design the closure device in a cost-effective manner, wherein in particular it also has to be taken into account that, for example, containers in the form of drinking bottles have to be replaced after a limited period of use.

It is also desirable to provide a system of a closure device in which a first closure part may be used in a flexible manner for attaching quite different objects, for example, to a bicycle. In this case, a uniform first closure part is intended to be permanently fastened, for example, to a vehicle and to permit an attachment of different objects provided with a second closure part, for example a container or a bicycle lock.

SUMMARY OF THE INVENTION

It is an object underlying the proposed solution to provide a closure device which is able to be handled in a simple manner, which permits a reliable fastening of two assemblies to one another and which may also be used in many different ways and in a flexible manner.

This object is achieved by a closure device having features as described herein.

Accordingly, the closure device has an arresting mechanism which is arranged on the second closure part and which has an arresting element and an actuating mechanism which is operatively connected to the arresting element. The arresting element can be brought into operative connection with the locking piece in the closed position, in order to lock the positively locked engagement between the first locking section and the second locking section, wherein the actuating mechanism may be actuated in order to adjust the arresting element relative to the locking receptacle so that the first locking section and the second locking section are releasable from one another.

The closure device has an arresting mechanism which serves to arrest the positively locked connection between the closure parts in the closed position such that the closure parts may not be easily removed from one another, in any case not without releasing the arresting mechanism. For the arresting procedure, the arresting mechanism has an arresting element which may be actuated via an actuating mechanism and which may be brought into operative connection and out of operative connection with the locking piece by the actuating mechanism in order to lock in the closed position of the locking device the positively locked connection between the locking sections of the locking piece and the locking receptacle receiving the locking piece or to release the locking piece such that the connection between the closure parts may be released.

For example, the locking sections may be rigidly formed on the locking piece, on the one hand, and on the locking receptacle, on the other hand. The locking sections may be configured, for example, in the manner of undercuts so that a latching projection is arranged on the locking piece to form an undercut which in the closed position is engaged with a locking section in the form of an undercut on the locking receptacle which projects into the region of the locking receptacle.

The arresting element is able to be brought into operative connection with the locking piece such that the engagement between the locking sections of the locking piece and the locking receptacle is locked thereby. If the arresting element is in locking abutment with the assigned locking piece, the locking section of the locking piece is not able to be brought out of engagement with the locking section of the locking receptacle, so that the positively locked connection between the closure parts is arrested. By actuating the actuating mechanism the arresting element may be brought out of abutment with the locking piece so that the engagement between the locking sections may be canceled and the closure parts may thus be released from one another.

Such an arresting mechanism may permit, on the one hand, a simple attachment of the closure parts to one another, with a secure hold of the closure parts on one another in the closed position. By actuating the actuating mechanism the connection between the closure parts may be canceled in a simple manner so that the closure parts may be released from one another in a convenient manner.

In one embodiment, the arresting element is adjustable on the second closure part in a plane extending transversely to the closing direction. The arresting element may be guided, for example, in a linearly displaceable manner transversely to the closing direction on the second closure part and thus displaced by the actuating mechanism in a linear manner on the second closure part, in order to bring the arresting element into operative connection or out of operative connection with the locking piece of the first closure part. Alternatively, the arresting element may also be moved in a rotational manner on the second closure part, for example by the arresting element being rotated on the second closure part about a rotational axis which is oriented in the closing direction.

In one embodiment, the actuating mechanism has a spring element which is configured to pretension the arresting element in the closed position in a resilient manner relative to the locking piece. Such a spring element provides a resilience in the actuating mechanism which has the effect that the arresting element is able to be brought into abutment with the locking piece under resilient pretensioning. Such a spring element may be arranged, for example, between two components of the actuating mechanism, for example between two levers, in order to connect the components to one another in a resilient manner. Alternatively, the spring element may also serve for mounting a component on the second closure part so that the actuating mechanism is resiliently supported via the spring element on the second closure part. In this case the pretensioning in the positively locked connection advantageously has the effect that changing loads, in particular vibrations, to which a bicycle is subjected on an uneven substrate, do not lead to a movement between the two closure parts and thus the wear associated therewith of the contact surfaces of the closure parts striking one another is prevented. Moreover, the pretensioning may also have the effect that in spite of production tolerances and already slightly worn contact surfaces the closure parts are nevertheless reliably connected together without play.

The actuating mechanism may be configured quite differently.

Thus the actuating mechanism may be configured, for example, as a lever mechanism, for example in the manner of a toggle lever.

In a further embodiment, the actuating mechanism may have an eccentric on which the arresting element is rigidly arranged or to which the arresting element is movably connected. Such an eccentric may implement, for example, an eccentric roller or an eccentric lever.

In turn, the actuating mechanism may alternatively have a screw element or a wedge element, the arresting element being adjustable thereby.

It is advantageous in this case that the actuating mechanism has a self-locking mechanism. Such a self-locking mechanism is intended to have the effect that when the arresting element is subjected to a load in the locking position of the arresting element it does not lead to an automatic resetting of the actuating mechanism and thus to a canceling of the locking action on the locking piece of the first closure part.

In one embodiment, the actuating mechanism has a lever element which is pivotable relative to the second closure part in order to adjust the arresting element relative to the locking receptacle.

Such a lever element may be pivotably mounted, for example, on a spring element connected to the second closure part so that the lever element is mounted via the spring element and is supported via the spring element on the second closure part. Via the spring element, therefore, firstly a pivoting of the lever element is permitted and secondly the joint axis via which the lever element is supported on the second closure part is able to be at least slightly deflected in a resilient manner so that a resilience is provided in the actuating mechanism for providing a pretensioning between the arresting element and the locking piece in the locking position.

The lever element may have, for example, a handle which a user may grip in order to pivot the lever element. Thus a manual actuation of the actuating mechanism is possible via the lever element.

In one embodiment, by interaction with the first magnetic element and/or the second element the lever element may be held magnetically in a lever position assigned to the closed position when the closure device is in the closed position. The lever element is thus arrested in its locking position by the magnetic action of at least one of the magnetic elements so that an inadvertent release of the locking is prevented or at least impeded.

The actuating mechanism may implement, for example, a toggle lever. To this end, for example, a connecting lever may be connected at a first joint axis in an articulated manner to the lever element and at a second joint axis in an articulated manner to the arresting element. In this case the lever element may be mounted in an articulated manner on the second closure part so that a toggle lever which may be adjusted between a locking position and a released position is implemented via the connecting lever and the lever element. If when adjusting the toggle lever the first joint axis, at which the spring element is connected in an articulated manner to the connecting lever, exceeds an (imaginary) line between the second joint axis at which the connecting lever is connected to the arresting element, and a third joint axis at which the lever element is mounted on the second closure part, such a toggle lever may be self-locking since an adjustment between the locked position and the released position is not possible in a simple manner by applying a load to the arresting element.

In one embodiment, the second closure part is releasably connectable to an assigned assembly, for example a container or a bicycle lock. The assembly may be designed in this case such that with an assembly attached to the second closure part the lever element is held by interaction with the assembly in the lever position assigned to the closed position. In this case, therefore, a locking of the lever element in its locked position takes place via the assembly connected to the second closure part.

In one embodiment, the arresting element has an undercut which may be brought into engagement with the locking section of the locking piece. The arresting element thus enters a positively locked engagement with the locking section of the locking piece in a locking position and thus produces an additional positively locked connection for connecting the closure parts to one another, wherein the arresting element also locks the positively locked engagement of the locking sections of the locking receptacles and the locking piece to one another.

In a further embodiment, the arresting element may be configured without an undercut and may press onto the locking piece in a direction oriented transversely to the closing direction so that via the arresting element the locking piece is held in a positively locked engagement with the locking section of the locking receptacle. In this case, therefore, the arresting element exclusively serves for locking the positively locked engagement of the locking sections of the locking piece and the locking receptacle to one another.

The first closure part of the closure device may have, for example, a single locking piece. Accordingly, the second closure part may also merely have a single locking receptacle for connecting to the locking piece of the first closure part.

In a further embodiment, however, the first closure part has two (or more) locking pieces which are shaped on a body of the first closure part offset to one another transversely to the closing direction. The locking pieces may be configured, for example, as rigid elements in the manner of pins on the body of the first closure part and thus implement male parts which may be inserted into locking receptacles implementing female parts on the second closure part in order to connect the closure parts to one another.

If the first closure part has two (or more) locking pieces, each locking piece has a locking section which in the closed position of the closure device is in a positively locked engagement with an assigned locking section on a locking receptacle of the second closure part.

The arresting mechanism in this case may have, for example, an arresting element for each locking piece so that the locking pieces may be locked in the assigned locking receptacles via the arresting elements.

In a further embodiment, the arresting mechanism accordingly may have a (single) arresting element which brings about a locking of a plurality of locking pieces in the assigned locking receptacles. To this end, the arresting element may act on a locking piece by the arresting element being brought into abutment with the assigned locking piece in order to block thereby the locking piece in the assigned locking receptacle. By blocking the locking piece in the assigned locking receptacle, one or more further locking pieces, which are rigidly connected to that locking piece, may also be blocked in the respectively assigned locking receptacles, so that a locking of a plurality of locking pieces in the assigned locking receptacles may be carried out by a single arresting element.

The object is also achieved by a closure device for connecting two assemblies to one another, comprising a first closure part which is to be arranged on one of the assemblies and which has at least two locking pieces with in each case a locking section and at least one first magnetic element and a second closure part which is to be fastened to the other of the assemblies and which has at least two locking receptacles and at least one second magnetic element. The first closure part and the second closure part are able to be attached to one another in a closing direction and are connected to one another in a closed position by the locking pieces of the first closure part being received in the locking receptacles of the second closure part. The first magnetic element and the second magnetic element are configured to assist magnetically the attachment of the first closure part and the second closure part to one another. Additionally, the closure device has an arresting mechanism which is arranged on the second closure part and which has at least two arresting elements and an actuating mechanism which is operatively connected to the arresting elements, wherein the arresting elements are able to be brought into operative connection with the locking sections of the locking pieces in the closed position, in order to produce a positively locked or frictional connection between the first closure part and the second closure part, wherein the actuating mechanism is able to be actuated in order to adjust the arresting elements relative to the locking receptacles so that the first closure part and the second closure part are releasable from one another.

In the closure device, the first closure part has two (or more) locking pieces, for example in the form of rigid pins, which are shaped on a body and which in each case bear a locking section. The locking pieces may be brought into engagement with locking receptacles of the second closure part in order to produce a positively locked or frictional connection between the closure parts.

In such a closure device, an actuating mechanism is provided, said actuating mechanism bringing into engagement the at least two arresting elements in the closed position, for example with the locking sections of the locking pieces, in order to connect the closure parts by positive locking to one another. In the closure device, locking sections, for example in the manner of undercuts, are shaped on the locking pieces of the first closure part. However, such locking sections may be dispensed with on the locking receptacles of the second closure part. A positively locked connection may be produced solely by the arresting elements and the engagement thereof with the locking sections of the locking pieces in the closed position of the closure device, so that the arresting elements (for example forming undercuts), which may be actuated via an actuating mechanism, produce a positively locked connection between the closure parts in the closed position by their engagement with the locking sections of the locking pieces.

Advantageously, in this case the locking receptacles are designed such that they also contribute to the positively locked connection, in particular by counteracting strong spring-pretensioned forces, which load the locking pieces in a distorting manner transversely to the closing direction, with a counterforce.

Alternatively, via the arresting mechanism a frictional connection may be produced between the closure parts by the locking pieces being pushed via the arresting elements transversely to the closing direction into abutment with the assigned abutment surfaces of the locking receptacles and thus in the closed position a frictional connection being brought about between the locking pieces and the locking receptacles.

The actuating mechanism may be configured, for example, by a toggle lever but may also be implemented in a different manner, for example with an eccentric, a screw or a wedge.

In one embodiment, the actuating mechanism has a lever element which is pivotable relative to the second closure part in order to adjust the arresting elements relative to the locking receptacles. The actuating mechanism may implement, for example, a toggle lever by a connecting lever being connected at a first joint axis in an articulated manner to the lever element and at a second joint axis in an articulated manner to one of the arresting elements. Additionally, the lever element may be connected at a third joint axis in an articulated manner to another of the arresting elements so that by adjusting the lever element the arresting elements may be adjusted at the same time, for example, in a linear manner on the second closure part.

In this embodiment a resilience may also be provided in the actuating mechanism, for example, via a spring element which connects components together in a resilient manner, for example by a joint axis being supported in a resilient manner.

At the same time, it is also conceivable that either the arresting elements, the locking sections on the arresting elements, the connecting lever, the actuating lever or an alterative actuating mechanism acting in a closing and pretensioning manner (comprising for example an eccentric, a screw or a wedge) have a resilience and, for example, are formed entirely or partially from a resilient material, such as rubber, silicone, TPU, TPE or the like.

A closure device of the type mentioned above may be used, for example, on a bicycle, wherein such a bicycle may be driven by human pedal power or even electrically. However, a closure device of the type described herein may be used in principle for connecting two assemblies of any type to one another.

BRIEF DESCRIPTION OF THE DRAWINGS

The idea underlying the proposed solution is to be described in more detail hereinafter by the exemplary embodiment shown in the figures.

FIG. 4 shows a further perspective view of the closure device according to FIG. 2;

FIG. 6A shows a view of the closure device without an object connected to the second closure part;

FIG. 6B shows a plan view of the closure device;

FIG. 6C shows a sectional view along the line A-A according to FIG. 6B;

FIG. 7A shows a view of the closure device when opened;

FIG. 7B shows a plan view of the closure device;

FIG. 7C shows a sectional view along the line A-A according to FIG. 7B;

FIG. 10A shows a view of the closure device when opened further;

FIG. 10B shows a plan view of the closure device;

FIG. 10C shows a sectional view along the line A-A according to FIG. 10B;

FIG. 12 shows a view of a further exemplary embodiment of a closure device, in a closed position of the closure parts with the object connected to one of the closure parts;

FIG. 13 shows a view of the closure device without the object;

FIG. 14 shows a view of the closure device when opened;

FIG. 15 shows a view of the closure device when opened further; and

FIG. 16 shows a view of the closure device when releasing the closure parts form one another.

DESCRIPTION OF THE INVENTION

Figure 1:
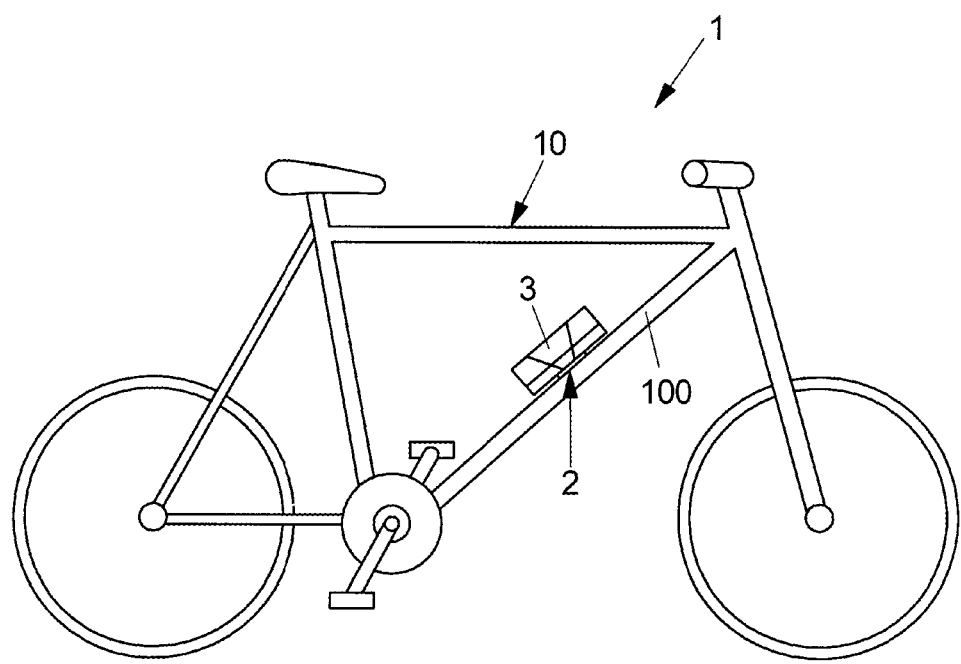
FIG. 1 shows a schematic view of a vehicle in the form of a bicycle.
Figure 3:
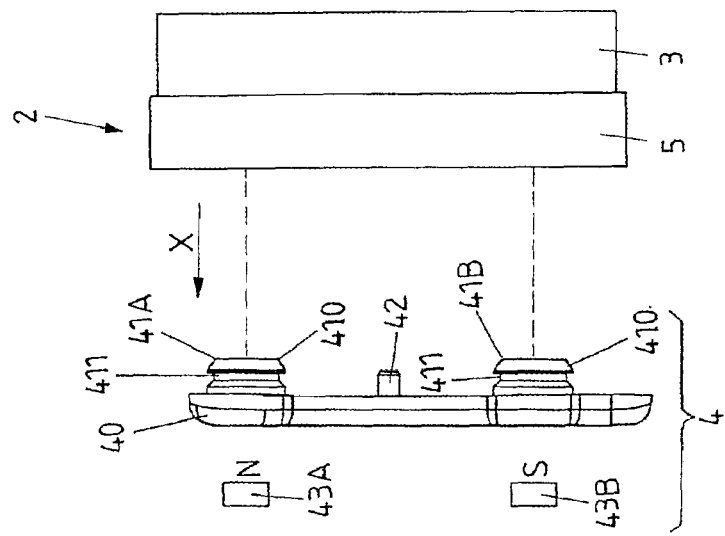
FIG. 3 shows a side view of the closure device according to FIG. 2.
Figure 2:
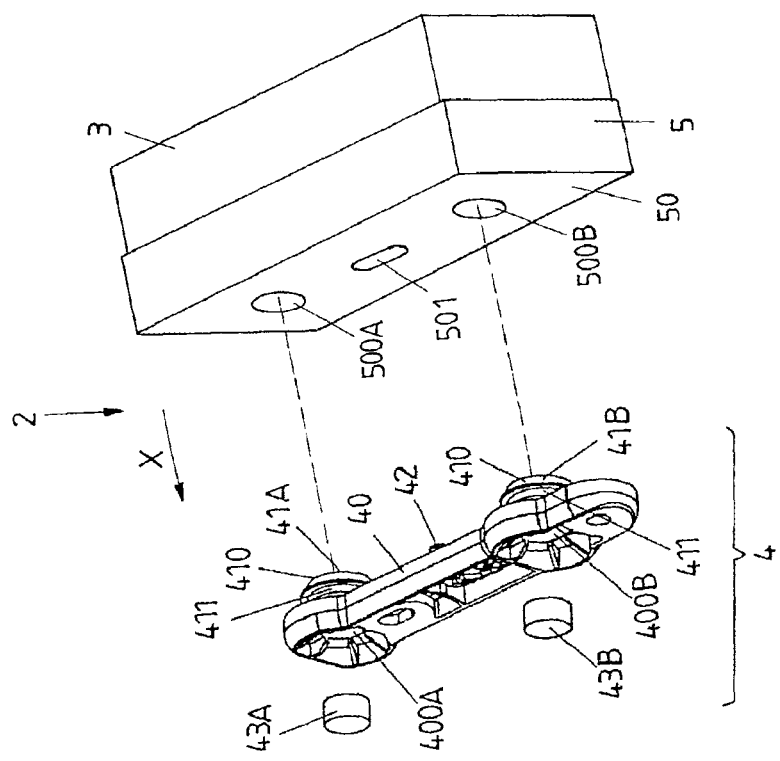
FIG. 2 shows a view of an exemplary embodiment of a closure device with a first closure part and a second closure part.

FIG. 1 shows in a schematic view a vehicle 1 in the form of a bicycle which has a frame 10 with a frame bar 100 onto which an assembly 3, for example in the form of a drinking bottle, a drinking bottle holder, a bicycle lock holder or a further container, for example a bag, is attached via a closure device 2.

FIGS. 2 to 11A-11C show an exemplary embodiment of a closure device 2 which serves for connecting an assembly 3, for example a container 3 or a bicycle lock, to the frame 10 of a vehicle 1. The closure device 2 has a first closure part 4 which may be fixedly connected, for example may be screwed, to a frame bar 100 of the frame 10 of the vehicle 1. A second closure part 5 which may be connected to the assembly 3 may be attached to the first closure part 4.

The first closure part 4 has a body 40, two locking pieces 41A, 41B protruding therefrom. The locking pieces 41A, 41B have in each case a shaft 411, a locking section 410 in the form of a latching projection in the manner of an undercut which circulates around the shaft 411 and at the same time protrudes radially outwardly from the shaft 411 being configured on the end thereof remote from the body 40.

The locking pieces 41A, 41B have—in this exemplary embodiment cylindrical—abutment surfaces spaced apart axially from the locking sections 410 for abutment against assigned abutment surfaces of the locking receptacles 51A, 51B.

On the side remote from the locking pieces 41A, 41B, the body 40 has receiving openings 400A, 400B at the location of the locking pieces 41A, 41B, magnetic elements 43A, 43B being inserted therein and fixedly connected to the body 40.

The second closure part 5 has a body 50 in which two closure openings 500A, 500B are formed, the first closure part 4 with the locking pieces 41A, 41B being able to be inserted therein in a closing direction X in order to close the closure device 2 and to connect together the closure parts 4, 5. A pin 42 which is arranged centrally between the locking pieces 41A, 41B is formed on the body 40 of the first closure part 4 and when connecting the closure parts 4, 5 to one another comes into engagement with an opening 501 on the body 50 of the second closure part 5, as is visible for example in FIG. 2 in combination with FIGS. 5A-5C.

In the present example, the opening 501 is elongated for displaceably receiving the pin 42. The pin 42 in this case is displaceable sufficiently far in the opening 501 that the locking sections 410 of the locking pieces 41A, 41B are able to be moved out of engagement with the locking sections 511 of the locking receptacles 51A, 51B, from a closed position in which the locking sections 410, 411 are in engagement with one another.

In an alternative embodiment, the opening 501 may also have a round shape for receiving the pin 42 with narrow tolerances in all directions. In this case, the locking sections 511 are arranged such that they may be brought out of engagement by rotating the closure parts relative to one another about the pin 42. In this case, a rotational mounting may be provided between the closure parts 4, 5 via the opening 501 and the pin 42.

Figure 5C:
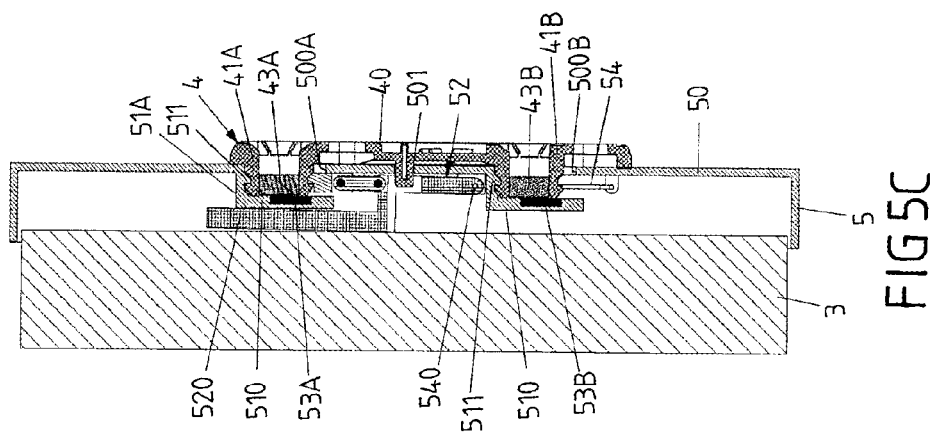
FIG. 5C shows a sectional view along the line A-A according to FIG. 5C.
Figure 5B:
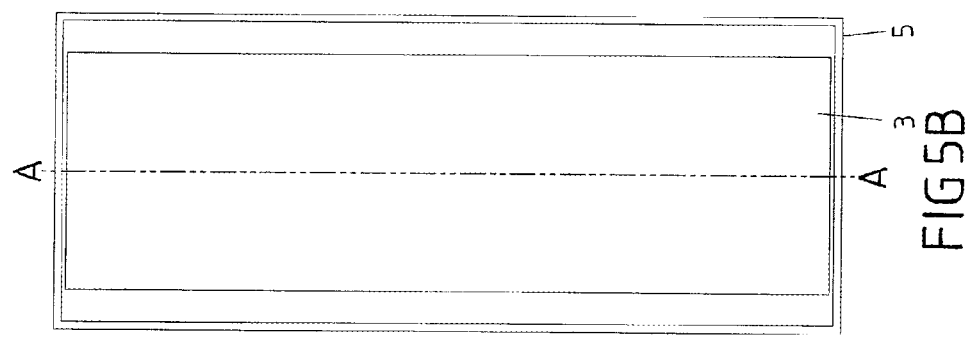
FIG. 5B shows a plan view of the closure device.
Figure 5A:
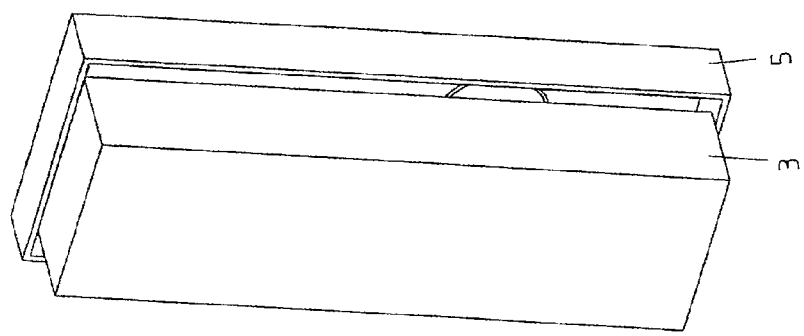
FIG. 5A shows a view of an exemplary embodiment of a closure device in a closed position with the object connected to a second closure part.
Figure 8C:
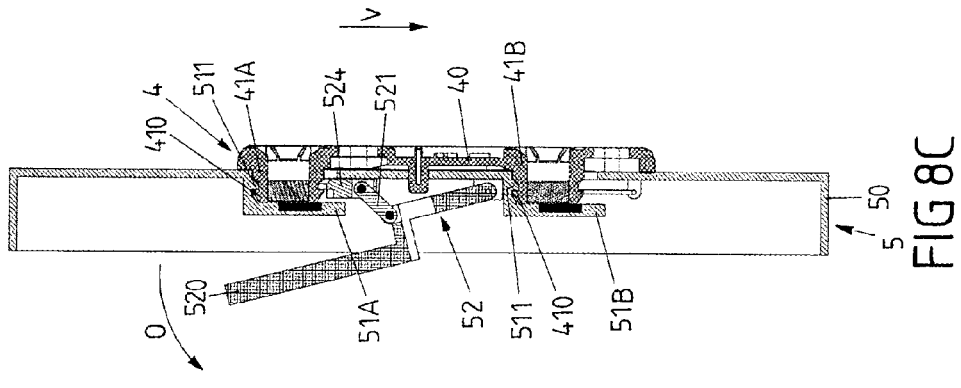
FIG. 8C shows a sectional view along the line A-A according to FIG. 8B.
Figure 8B:
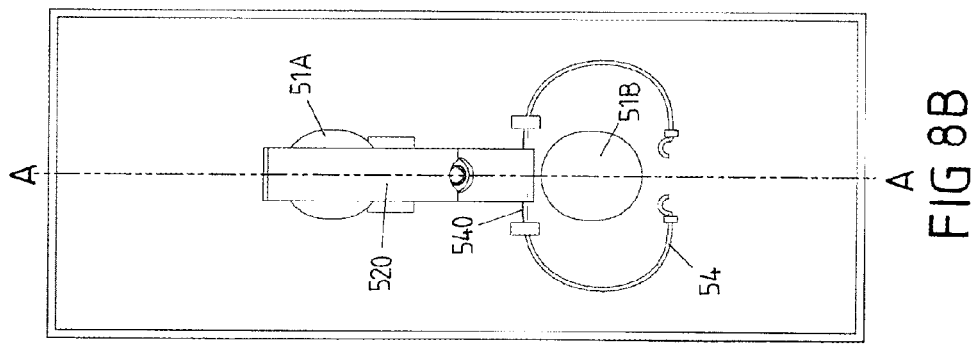
FIG. 8B shows a plan view of the closure device.
Figure 8A:
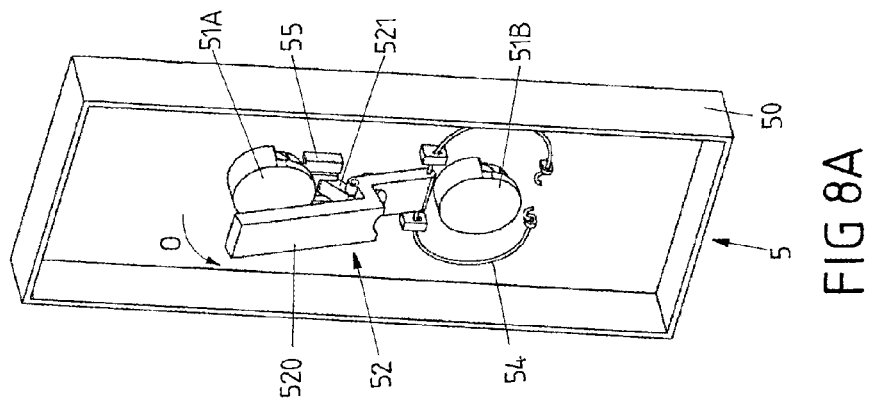
FIG. 8A shows a view of the closure device when opened further.
Figure 9C:
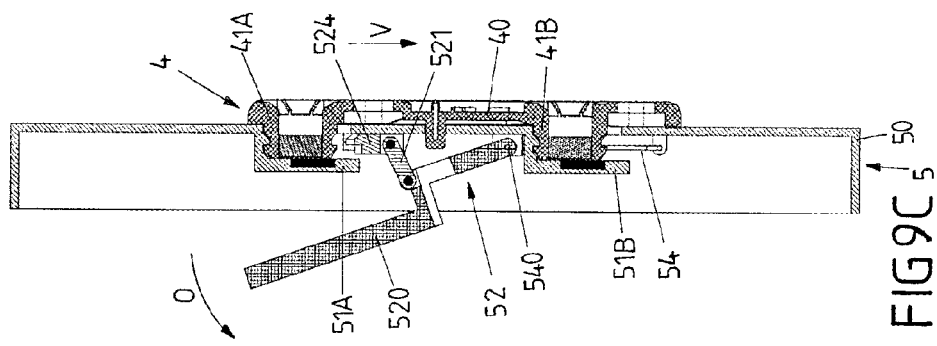
FIG. 9C shows a sectional view along the line A-A according to FIG. 9B.
Figure 9B:
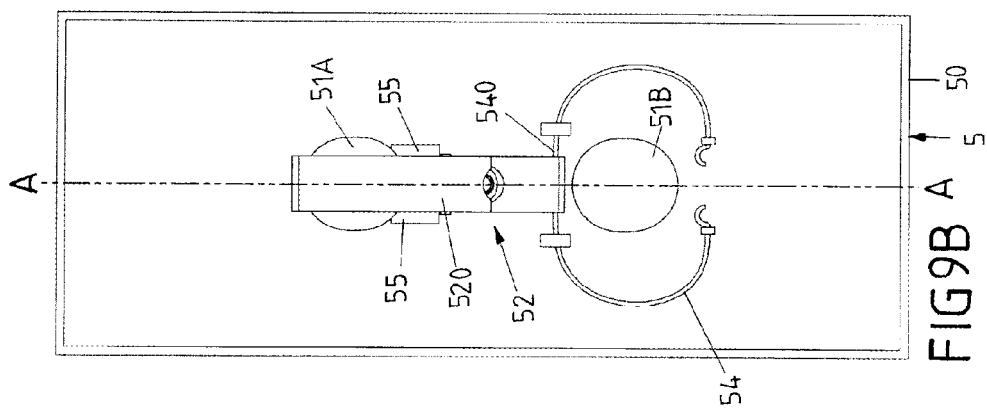
FIG. 9B shows a plan view of the closure device.
Figure 9A:
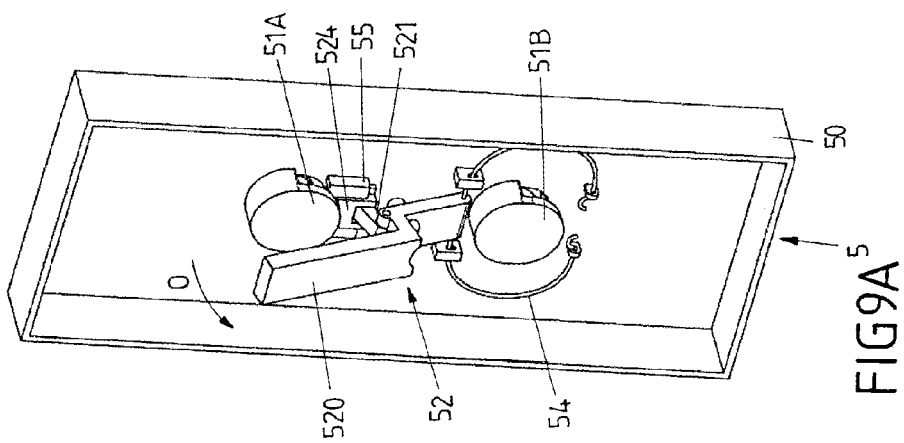
FIG. 9A shows a view of the closure device when opened further.

As visible from the sectional view according to FIG. 5C, the second closure part 5 has locking receptacles 51A, 51B, the locking pieces 41A, 41B of the first closure part 4 being able to be inserted therein for closing the closure device 2. The locking receptacles 51A, 51B are defined in the closing direction X by walls 510 on which magnetic elements 53A, 53B are arranged, when connecting the closure parts 4, 5 together said magnetic elements cooperating by magnetic attraction with the magnetic elements 43A, 43B on the locking pieces 41A, 41B of the first closure part 4 so that the attachment of the closure parts 4, 5 onto one another is magnetically assisted.

The magnetic elements 43A, 43B, 53A, 53B may be respectively configured as permanent magnets and in this case face one another with unlike poles so that a magnetic force of attraction is present between the closure parts 4, 5. Alternatively, it is also conceivable that the magnetic elements 43A, 43B, 53A, 53B are configured on one of the closure parts 4, 5 as permanent magnets and the magnetic elements 53A, 53B, 43A, 43B on the other of the closure parts 5, 4 are configured as magnetic armatures made of a ferromagnetic material.

The magnetic elements 43A, 43B, 53A, 53B of the closure parts bring about a prepositioning such that the locking sections 410, 511 may be brought into the closed position, for example without colliding with one another. If the magnetic elements 43A, 43B, 53A, 53B are configured as permanent magnets and if they are oriented opposite one another in the closed position, the magnetic attraction additionally brings about the engagement of the locking sections 410, 511.

In the exemplary embodiment shown, locking sections 511 in the form of undercuts protruding inwardly transversely to the closing direction X are formed on the locking receptacles 51A, 51B, the locking sections 410 of the locking pieces 41A, 41B being in a positively locked engagement thereby in the closed position of the closure device 2, so that the closure parts 4, 5 are mechanically connected to one another.

An arresting mechanism 52 which serves to arrest the engagement of the locking pieces 41A, 41B to the locking receptacles 51A, 51B in the closed position is arranged on the second closure part 5, such that the positively locked engagement between the locking sections 410 on the locking pieces 41A, 41B and the locking sections 511 on the locking receptacles 51A, 51B is locked, as is visible in FIGS. 5C and 6C.

In the exemplary embodiment shown, the arresting mechanism 52 has a lever element 520 which is pivotably mounted via a spring element 54 on the body 50 of the second closure part 5. To this end the spring element 54 forms a bearing section 540 which is resiliently deformable and on which the lever element 520 is pivotably arranged, as is visible in particular in FIG. 6A.

The lever element 520 is connected at a first joint axis 522 in an articulated manner to a connecting lever 521, as is visible in FIG. 6C. The connecting lever 521 protrudes over a second joint axis 523 at an end remote from the first joint axis 522 with an arresting element 524 in an articulated connection. The arresting element 524 is guided between guide elements 55 in a linearly displaceable manner on the body 50 of the second closure part 5 and by adjusting the lever element 520 may be brought into engagement and out of engagement with the locking piece 41A, shown at the top in FIG. 6C.

The arresting mechanism 52 serves to lock the locking pieces 41A, 41B together in the assigned locking receptacles 51A, 51B so that the connection between the closure parts 4. 5 is mechanically blocked. In a locking position, in this case the arresting element 524 engages with an undercut formed thereon in the locking section 410 of the assigned locking piece 41A so that via the arresting element 524 the locking piece 41A is in a positively locked engagement with the locking section 511 of the assigned locking receptacle 51A, as visible in FIG. 6C.

The abutment of the arresting element 524 on the locking piece 41A is brought about via the lever element 520 which together with the connecting lever 521 implements a toggle lever, and takes place by resilient pretensioning, by the lever element 520 being resiliently supported relative to the body 50 of the second closure part 5 via the spring element 54 and the bearing section 540.

Since the lever element 520 together with the connecting lever 521 implements a toggle lever, the blocking of the locking piece 41A in the locking receptacle 51A is self-locking since a load on the arresting element 524 is not able to lead to an automatic release of the arresting mechanism 52, due to the joint axis 522, for releasing the arresting mechanism 52, having to exceed an imaginary line (in cross section according to FIG. 6C) between the joint axis 523 and the bearing section 540 which is not possible without the action of force on the lever element 520.

The position of the lever element 520 may be magnetically blocked in the locked position by the lever element 520 being produced, for example, from a magnetic material, for example a ferromagnetic material, and cooperating with the magnetic elements 43A, 53A and, as a result, being magnetically held in the locked position according to FIG. 6C.

Additionally or alternatively, when the assembly 3 is attached, the lever element 520 may also be blocked in the locked position by the assembly 3, so that the lever element 520 is not actuatable when the assembly 3 is attached to the closure part 5.

For releasing the second closure part 5 from the first closure part 4 the lever element 520 may be pivoted in an opening direction O relative to the second closure part 5, as visible in FIGS. 7A-7C, FIGS. 8A-8C and FIGS. 9A-9C. By pivoting the lever element 520 the arresting element 524 is moved in an adjusting direction V transversely to the closing direction X away from the assigned locking piece 41A so that the locking of the locking piece 41A in the locking receptacle 51A is canceled.

If the locking is canceled the second closure part 5, as shown in FIGS. 10A-10C, may be adjusted in a release direction L relative to the first closure part 4 so that the engagement between the locking sections 410, 511 of the locking pieces 41A, 41B and the locking receptacles 51A, 51B is canceled. The release direction L is in this case oriented counter to the adjusting direction V and transversely to the closing direction X.

The movement of the closure parts 4, 5 to one another in the release direction L in this case is magnetically assisted by an offset of the magnetic elements 43A, 43B, 53A, 53B transversely to the closing direction X.

Figure 11C:
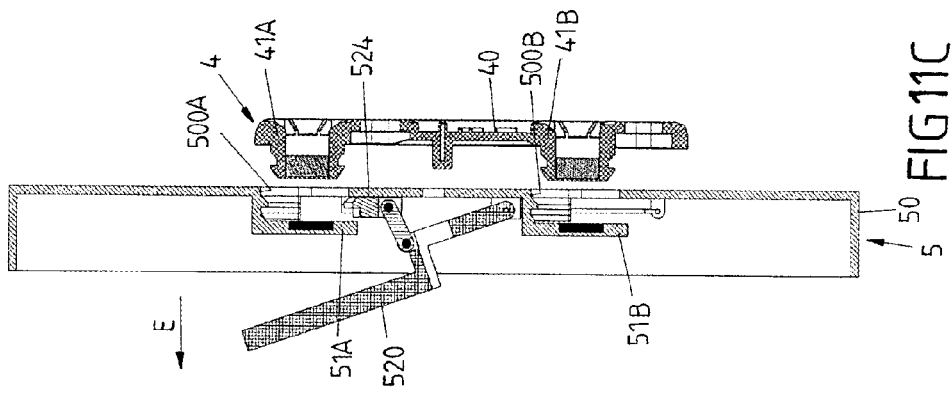
FIG. 11C shows a sectional view along the line A-A according to FIG. 11B.
Figure 11B:
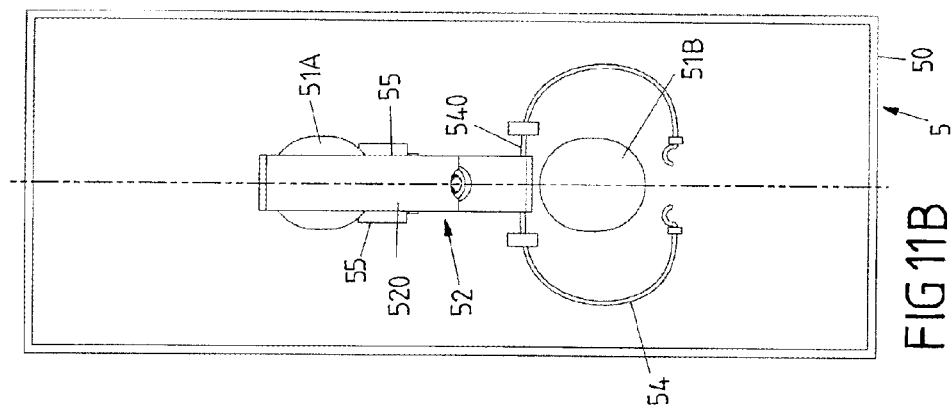
FIG. 11B shows a plan view of the closure device.
Figure 11A:
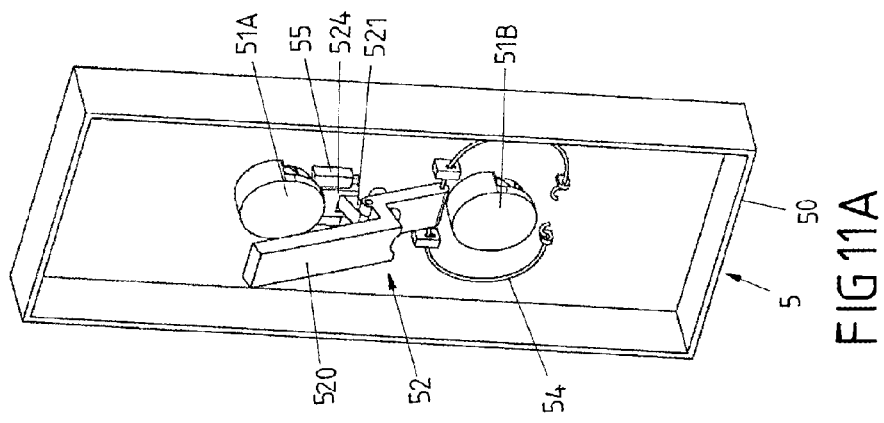
FIG. 11A shows a view of the closure device when releasing the closure parts from one another.

If the positively locked engagement between the locking sections 410, 511 is canceled, the closure parts 4, 5 may be moved away from one another in a separating direction E as shown in FIGS. 11A-11C.

In the exemplary embodiment shown, the locking pieces 41A, 41B, which are rigidly connected to one another via the body 40, are locked together via a single arresting element 524 in the assigned locking receptacles 51A, 51B. The arresting element 524 in this case exclusively acts on one of the locking pieces 41A, 41B and locks this locking piece in the assigned locking receptacle 51A. Due to the rigid connection of the locking pieces 41A, 41B to one another via the body 40, the other locking piece 41B is also blocked thereby in the assigned locking receptacle 51B.

In the exemplary embodiment described above, the arresting element 524 has an undercut and thus is in a positively locked engagement with the locking section 410 of the assigned locking piece 41A when the closure part 4 is locked in the closed position, as visible in FIGS. 5A-5C and 6A-6C.

At the same time it is also conceivable to configure the arresting element 524 without an undercut, so that the arresting element 524 merely acts transversely to the closing direction X by pushing on the assigned locking piece 41A and thus pushes this locking piece into engagement with the assigned locking section 511 of the locking receptacle 51A and as a result locks said locking piece in the locking receptacle 51A.

In a further exemplary embodiment shown in FIGS. 12 to 16 the locking receptacles 51A, 51B do not have any locking sections but implement substantially cylindrical guides into which the locking pieces 41A, 41B of the closure part 4 may be inserted in the closing direction X. In this case, the locking pieces 41A, 41B and the locking receptacles 51A, 51B respectively have, as described above, magnetic elements 43A, 43B, 53A, 53B which magnetically assist the attachment of the closure parts 4, 5 in the closing direction X.

In the exemplary embodiment shown in FIGS. 12 to 16, the arresting mechanism 52 has two arresting elements 524, 527 which in each case are assigned to one of the locking pieces 41A, 41B and linearly displaceable relative to the locking receptacles 51A, 51B by an actuating mechanism. The arresting elements 524, 527 in each case have an undercut and in the closed position according to FIGS. 12 and 13 are in a positively locked engagement with the locking sections 410 of the locking pieces 41A, 41B of the closure part 4, so that a positively locked connection is provided thereby between the closure parts 4, 5.

The arresting mechanism 52 has a lever element 520 which is connected at a joint axis 526 in an articulated manner to the arresting element 527. The lever element 520 is connected via a joint axis 522 in articulated manner to a locking lever 521, which in turn is coupled via a joint axis 523 in an articulated manner to the arresting element 524. The joint axis 523 is supported via a spring element 525 in a resilient manner relative to the connecting lever 521 such that the joint axis 523 is resiliently displaceable in a slot of the connecting lever 521 and thus the arresting element 524 is resiliently supported relative to the connecting lever 521.

In the locked position of the arresting mechanism 52 according to FIG. 12, the arresting elements 524, 527 are engaged with the locking pieces 41A, 41B so that a connection is produced between the closure parts 4, 5. FIG. 12 shows the closure device 2 with an object 3 arranged on the closure part 5. FIG. 13 shows the closure device 2 with the object 3 released from the closure part 5.

For separating the closure parts 4, 5 from one another the lever element 520 may be pivoted in an opening direction O, whereby the arresting elements 524, 527 in each case may be brought out of engagement with the locking pieces 41A, 41B in an assigned adjusting direction V, V', as is visible in the transition from FIG. 14 to FIG. 15. In order to ensure a simultaneous adjustment of the arresting elements 524, 527, in this case a suitable guide for the lever element 520, the connecting lever 521 and/or the arresting elements 524, 527 may be provided on the second closure part 5, for example by the joint axis 522 between the lever element 520 and the connecting lever 521 being guided relative to the closure part 5, perpendicular to the closure part 5, i.e. in the closing direction X, and thus held in position transversely to the closing direction X.

If the arresting elements 524, 527 have been brought out of engagement with the locking pieces 41A, 41B, the locking pieces 41A, 41B may be removed from the locking receptacles 51A, 51B in a separating direction E, as visible in FIG. 16. The closure parts 4, 5 may thus be separated from one another.

The idea underlying the solution is not limited to the exemplary embodiments set forth above but may also be implemented in any other manner.

In the exemplary embodiments described above an actuating mechanism of the arresting mechanism is implemented by a toggle lever. However, this is not in any way limiting. For example, such an actuating mechanism may also be configured with an eccentric, with a screw, or with a wedge.

In this case, it is desirable to provide a self-locking in the actuating mechanism which has the effect that a load on one or on both arresting elements does not lead to an automatic unlocking of the arresting mechanism. However, this is also not absolutely necessary but instead, for example, a blocking may be provided in any other manner on a component of the arresting mechanism.

A closure device of the type described is able to be used for connecting any assemblies to one another. Advantageously a closure device of the type described may be used, for example, for connecting objects to a bicycle, wherein the first closure part is advantageously fixedly and permanently connected to the bicycle and different objects, for example a drinking bottle or a bicycle lock, may be connected to the bicycle via a second closure part.

LIST OF REFERENCE NUMERALS

1 First assembly (vehicle)
10 Frame
100 Frame bar
2 Closure device
3 Second assembly (container)
4 Closure part
40 Body
400A, 400B Receiving opening
41A, 41B Locking piece
410 Locking section (undercut)
411 Shaft
42 Pin
43A, 43B Magnetic element
5 Closure part
50 Body
500A, 500B Closure opening
501 Opening
51A, 51B Locking receptacle
510 Wall
511 Locking section (undercut)

52 Arresting mechanism
520 Lever element
521 Connecting lever
522, 523 Joint axis
524 Arresting element
525 Spring element
526 Joint axis
527 Arresting element
53A, 53B Magnetic element
54 Spring element
540 Bearing section
55 Guide element
E Separating direction
L Releasing direction
O Opening direction
V, V' Adjusting direction
X Closing direction

The invention claimed is:

1. A closure device for connecting two assemblies to one another, comprising
   a first closure part to be arranged on one of the assemblies and comprising a locking piece with a first locking section and a first magnetic element,
   a second closure part to be fastened to the other of the assemblies and having a locking receptacle with a second locking section and a second magnetic element, wherein the first closure part and the second closure part are attachable to one another in a closing direction and are connected to one another in a closed position by positive locking counter to the closing direction, by the locking piece of the first closure part being received in the locking receptacle of the second closure part and the first locking section of the locking piece being in a positively locked engagement with the second locking section of the locking receptacle, wherein the first magnetic element and the second magnetic element are configured to assist magnetically the attachment of the first closure part and the second closure part to one another, and
   an arresting mechanism arranged on the second closure part and having an arresting element and an actuating mechanism operatively connected to the arresting element, wherein the arresting element can be brought into operative connection with the locking piece in the closed position, in order to lock the positively locked engagement between the first locking section and the second locking section, wherein the actuating mechanism may be actuated in order to adjust the arresting element relative to the locking receptacle so that the first locking section and the second locking section are releasable from one another,
   wherein the actuating mechanism has a lever element which is pivotable relative to the second closure part in order to adjust the arresting element relative to the locking receptacle.

2. The closure device as claimed in claim 1, wherein the first locking section is rigidly formed on the locking piece and the second locking section is rigidly formed on the locking receptacle.

3. The closure device as claimed in claim 1, wherein the arresting element is adjustable on the second closure part in a plane extending transversely to the closing direction.

4. The closure device as claimed in claim 1, wherein the arresting element is guided in a linearly displaceable manner transversely to the closing direction on the second closure part or is rotatable relative to the second closure part about the closing direction.

5. The closure device as claimed in claim 1, wherein the actuating mechanism has a spring element which is configured to pretension the arresting element in the closed position in a resilient manner relative to the locking piece.

6. The closure device as claimed in claim 1, wherein the lever element is pivotably mounted on a spring element connected to the second closure part.

7. The closure device as claimed in claim 1, wherein by interaction with the first magnetic element and/or the second magnetic element the lever element is held magnetically in a lever position assigned to the closed position when the closure device is in the closed position.

8. The closure device as claimed in claim 1, wherein the actuating mechanism has a connecting lever which is connected at a first joint axis in an articulated manner to the lever element and at a second joint axis in an articulated manner to the arresting element.

9. The closure device as claimed in claim 1, wherein the second closure part is releasably connectable to an assigned assembly, wherein in a position connected to the assembly the lever element is held by the interaction with the assembly in a lever position assigned to the closed position.

10. The closure device as claimed in claim 1, wherein the arresting element has an undercut which may be brought into engagement with the locking section of the locking piece.

11. The closure device as claimed in claim 1, wherein the first closure part has at least two locking pieces with in each case a first locking section and the second closure part has at least two locking receptacles with in each case a second locking section, wherein in the closed position the locking pieces of the first closure part are received in the locking receptacles of the second closure part and the first locking sections of the locking pieces are in a positively locked engagement with the second locking sections of the locking receptacles.

12. The closure device as claimed in claim 11, wherein the arresting mechanism comprises only one arresting element which is able to be brought into abutment with one of the locking pieces in the closed position but not with the other of the locking pieces.

13. A closure device for connecting two assemblies to one another, comprising
   a first closure part which is to be arranged on one of the assemblies and which has at least two locking pieces with in each case a locking section and at least one first magnetic element,
   a second closure part which is to be fastened to the other of the assemblies and which has at least two locking receptacles and at least one second magnetic element, wherein the first closure part and the second closure part are attachable to one another in a closing direction and are connected to one another in a closed position, by the locking pieces of the first closure part being received in the locking receptacles of the second closure part, wherein the first magnetic element and the second magnetic element are configured to assist magnetically the attachment of the first closure part and the second closure part to one another, and
   an arresting mechanism which is arranged on the second closure part and which has at least two arresting elements and an actuating mechanism which is operatively connected to the arresting elements, wherein the arresting elements are able to be brought into operative connection with the locking sections of the locking pieces in the closed position, in order to produce a positively locked connection or a frictional connection between the first closure part and the second closure part, wherein the actuating mechanism is actuatable actuated in order to adjust the arresting elements relative to the locking receptacles so that the first closure part and the second closure part are releasable from one another,
wherein the actuating mechanism has a lever element which is pivotable relative to the second closure part in order to adjust the arresting elements relative to the locking receptacles.

14. The closure device as claimed in claim 13, wherein the actuating mechanism has a connecting lever which is connected at a first joint axis in an articulated manner to the lever element and at a second joint axis in an articulated manner to one of the arresting elements.

15. The closure device as claimed in claim 14, wherein the lever element is connected at a third joint axis in an articulated manner to another of the arresting elements.

16. A bicycle comprising a closure device, for fastening an assembly to a frame of the bicycle, the closure device comprising
a first closure part to be arranged on one of the assemblies and comprising a locking piece with a first locking section and a first magnetic element,
a second closure part to be fastened to the other of the assemblies and having a locking receptacle with a second locking section and a second magnetic element, wherein the first closure part and the second closure part are attachable to one another in a closing direction and are connected to one another in a closed position by positive locking counter to the closing direction, by the locking piece of the first closure part being received in the locking receptacle of the second closure part and the first locking section of the locking piece being in a positively locked engagement with the second locking section of the locking receptacle, wherein the first magnetic element and the second magnetic element are configured to assist magnetically the attachment of the first closure part and the second closure part to one another, and
an arresting mechanism arranged on the second closure part and having an arresting element and an actuating mechanism operatively connected to the arresting element, wherein the arresting element can be brought into operative connection with the locking piece in the closed position, in order to lock the positively locked engagement between the first locking section and the second locking section, wherein the actuating mechanism may be actuated in order to adjust the arresting element relative to the locking receptacle so that the first locking section and the second locking section are releasable from one another,
wherein the first locking section is rigidly formed on the locking piece,
wherein the second locking section is rigidly formed on the locking receptacle and/or is formed by an undercut of the arresting element which may be brought into engagement with the first locking section of the locking piece.

* * * * *